UNITED STATES PATENT OFFICE 2,072,485

VAT DYESTUFFS OF THE ANTHRAQUINONE SERIES AND PROCESS OF MAKING THE SAME

Roland Scholl, Dresden, Kurt Meyer, Berlin-Zehlendorf, and Joachim Donat, Dresden, Germany No Drawing. Application January 24, 1936, Serial No. 60,738. In Switzerland February 2, 1935

10 Claims. (Cl. 260—61)

This invention relates to the manufacture of vat-dyestuffs of the anthraquinone series and intermediate products therefor and consists in allowing to act on ketones of the general formula—

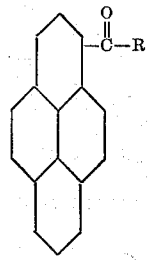

in which R stands for an aromatic nucleus selected from the group consisting of nuclei of the benzene or naphthalene series, in presence of a condensing agent of the group consisting of aluminium chloride and ferric chloride and in presence of an indifferent flux, at temperatures lying above 110° C., reactive derivatives selected from the group consisting of anhydrides and acid halides of such aromatic carboxylic acids of the benzene or naphthalene series which contain at least once the atomic grouping—

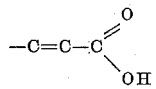

Diketones are first obtained which suffer ring closure and are thus converted into cyclic di- or polyketones, which are in part new and in part already known vat-dyestuffs. The condensing agents used—aluminium chloride and ferric chloride—are mixed advantageously with indifferent agents which facilitate the fusion, such as sodium chloride or zinc chloride. The reaction may be accelerated by the presence of an oxidizing agent, for instance oxygen, manganese dioxide or the like.

As ketones of the general formula—

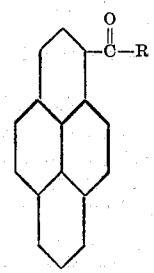

in which R stands for an aromatic radical selected from the group consisting of the benzene or naphthalene series, may be named: monobenzoyl-pyrene, para-bromobenzoylpyrene, β-naphthoyl-pyrene, para-toluyl-pyrene, pyrene-monophthaloylic acid or halogenation products of such compounds and the like. Products of this kind are obtainable by the reaction of 1 mol. of carboxylic acid or a halide or anhydride of a carboxylic acid which is characterized by the presence of the grouping—

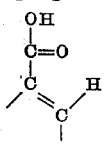

the reaction occurring in presence of a solvent which is suitable for the Friedel-Crafts reaction and contains at least two carbon atoms connected to each other. Thus, for example monobenzoylpyrene is produced as follows:—10 parts by weight of pyrene in 100 parts by volume of benzene are shaken with 9.1 parts by weight of benzoyl chloride and 7 parts by weight of aluminium chloride for 5 hours at 20° C. After removing the solvent by means of steam there is obtained a residual resinous product which may be recrystallized from glacial acetic acid. This substance constitutes 12 parts by weight or 80 per cent. of the theoretical yield of a pure monobenzoyl-pyrene.

As aromatic carboxylic acids containing at least once the atomic grouping—

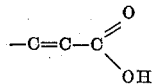

there may be named: benzoic acid, the toluic acids, α- and β-naphthoic acids, phthalic acids, cinnamic acids or the like.

Among the aromatic carboxylic acids which contain the atomic grouping—

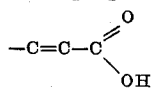

are included the carboxylic acids of the benzene or naphthalene series which contain the —C=C— group outside the aromatic nucleus, such as cinnamic acid of the formula—

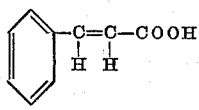

further also of such carboxylic acids which contain the —C=C— group within the aromatic nucleus, such as benzoic acid of the formula—

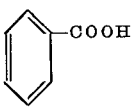

or phthalic acid of the formula—

Particularly valuable products are obtained with the purely aromatic carboxylic acids, such as benzoic acid or phthalic acid.

As indicated above, according to the present process there are obtained dyestuffs which are in part new and in part already known. Among the new dyestuffs those are particularly valuable which correspond to the general formula—

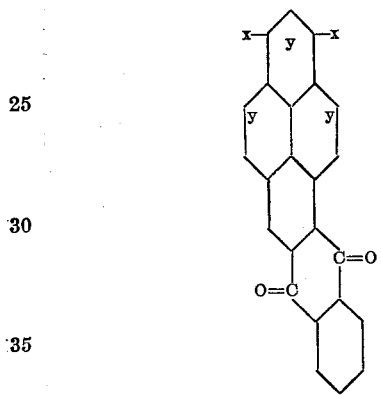

in which one $x$ stands for a hydrogen atom and the other $x$ stands for a C=O group which is linked by a chain consisting of two to three carbon atoms to a carbon atom $y$ of the pyrene ring in such a manner that there is formed a new six membered ring.

The fastness of the dyestuffs obtainable by this invention may be improved by halogenation.

The following examples illustrate the invention, the parts being by weight unless otherwise stated, and the parts by weights and parts by volume being related to each other as is the kilo to the litre:—

*Example 1*

Into a fused mass of 270 parts of aluminium chloride and 65 parts of sodium chloride, heated to 110–120° C. and capable of being stirred there are introduced 30 parts of mono-benzoyl-pyrene and 16.5 parts of para-toluic acid-chloride, the temperature is raised quickly to 165° C. and oxygen is passed in until the reaction is complete, the fused mass becoming blue. After decomposing this crude product with water it is vatted. The product thus obtained is a new mono-methylpyranthrone of the formula—

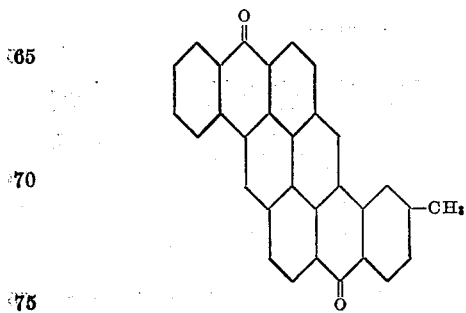

It may be crystallized from quinoline in the form of orange needles; it dissolves in concentrated sulfuric acid to a blue solution and dyes cotton orange in a violet vat.

The substitution of the corresponding quantity of α-naphthoyl-chloride for the toluic acid-chloride leads to a new monobenzpyranthrone; from mono-benzoylpyrene and benzoyl-chloride on the other hand, there is obtained the already known pyranthrone and from mono-benzoyl-pyrene and meta- or para-bromobenzoyl-chloride there is obtained the mono-bromo-pyranthrone.

The substitution for the mono-benzoyl-pyrene of the bromination product obtained by direct bromination thereof leads to brominated pyranthrones.

*Example 2*

A mixture of 40 parts of mono-benzoyl-pyrene, 300 parts by volume of acetylene tetrachloride, 32 parts of toluic acid-chloride and 2 parts of sublimed ferric chloride is heated to boiling for 30 minutes. After the reaction and expulsion of the solvent the diaroylpyrene is obtained.

30 parts of this diketone are introduced into a fused mass of 240 parts of aluminium chloride and 60 parts of sodium chloride heated to 110–120° C. The temperature is raised quickly to 165° C. and oxygen is led in for 3 hours. The mass is then worked up in the usual manner so as to obtain the mixed pyranthrone.

*Example 3*

30 parts of mono-benzoyl-pyrene and 18 parts of cinnamic acid-chloride are introduced into a fused mass of 270 parts of aluminium chloride and 65 parts of sodium chloride heated to 110–120° C.; the temperature is quickly raised to 165° C. and oxygen is led in for 2½ to 3 hours. After the usual working up operations there is obtained a dyestuff of the formula—

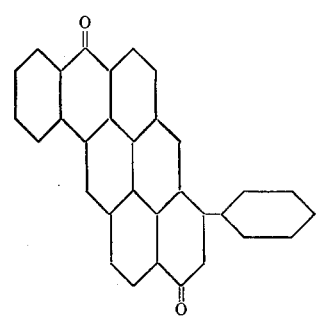

which dyes in a red vat vivid orange and dissolves to a violet solution in concentrated sulfuric acid.

A similar product is obtained from mono-cinnamoyl-pyrene and benzoyl chloride.

*Example 4*

Into a fused mass of 270 parts of aluminium chloride, 65 parts of sodium chloride and 16 parts of phthalic acid anhydride there are gradually introduced, while stirring, 30 parts of mono-benzoyl-pyrene. A lively reaction ensues. The temperature is then raised to 165° C. and oxygen is introduced for 2–3 hours. The crude product obtained in the usual manner is dark brown and yields when vatted a benzoylene-phthaloyl-pyrene of the formula—

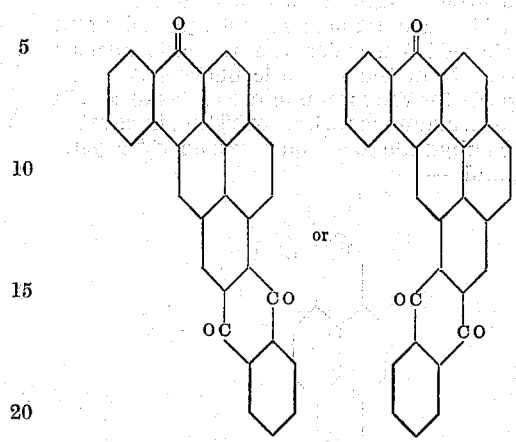

which dyes cotton brown-orange in a brown vat. The benzoylene-phthaloyl-pyrene dissolves in concentrated sulfuric acid to a blue-violet solution. By bromination the colour becomes more reddish.

*Example 5*

Into a fused mass of 27 parts of aluminium chloride and 6.5 parts of sodium chloride heated to 110° C., there are introduced, while stirring, 2.5 parts of pyrene-mono-phthaloylic acid (compare German Patent No. 589,045), and finally 1.5 parts of benzoyl chloride. A lively reaction with foaming occurs. This is carried to an end, by heating for 2½ hours at 165° C., while oxygen is introduced. After the reaction there is obtained by vatting the crude product 2.8 parts of dyestuff, which behaves like the product of Example 4.

*Example 6*

Into a fused mass of 270 parts of aluminium chloride and 65 parts of sodium chloride, heated to 110° C. there is introduced, while stirring, a mixture of 35 parts of pyrene-mono-phthaloylic acid and 25 parts of phthalic anhydride, and the temperature is finally raised for 2 hours to 180° C. The dyestuff of the formula—

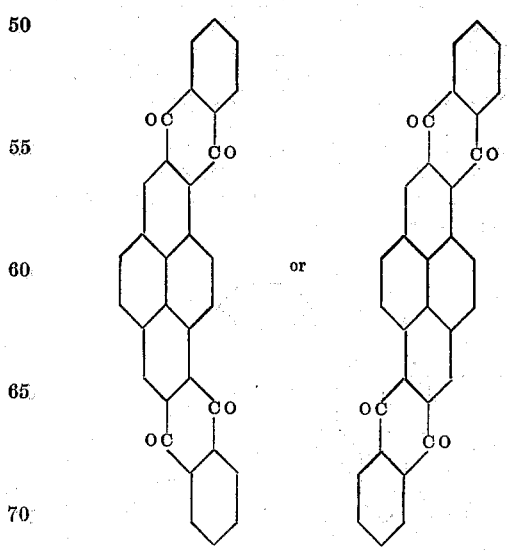

is isolated from the crude fused mass by vatting and subsequently extracting the crude dyestuff with hot trichlorobenzene and allowing it to crystallize. It dyes cotton in a dark violet vat yellow-orange and dissolves in sulfuric acid to a pure green solution.

*Example 7*

For the bromination of 10 parts of benzoylene-phenyl-benzpyrenone (compare Example 3, first paragraph) these are heated with 100 parts by volume of nitrobenzene and 20 parts of bromine in a reflux apparatus until evolution of hydrogen bromide begins to slacken after about 30 minutes. The greater part of the brominated dyestuff separates on cooling. It is filtered; it dyes orange-red in a vat.

What we claim is:—

1. Process for the manufacture of vat-dyestuffs of the anthraquinone series, consisting in causing to act on ketones of the general formula—

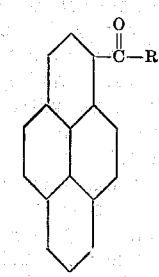

in which R stands for an aromatic nucleus selected from the group consisting of nuclei of the benzene or naphthalene series, in presence of a condensing agent of the group consisting of aluminium chloride and ferric chloride and in presence of an indifferent flux, at temperatures lying above 110° C., reactive derivatives selected from the group consisting of anhydrides and acid halides of such aromatic carboxylic acids of the benzene or naphthalene series which contain at least once and not more than twice the atomic grouping—

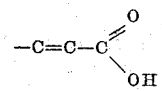

2. Process for the manufacture of vat dyestuffs of the anthraquinone series, consisting in causing to act on ketones of the general formula—

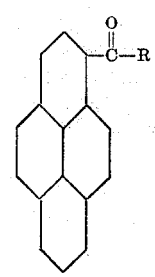

in which R stands for an aromatic nucleus selected from the group consisting of nuclei of the benzene or naphthalene series, in presence of a condensing agent of the group consisting of aluminium chloride and ferric chloride and in presence of an indifferent flux, at temperatures lying above 110° C., reactive derivatives selected from the group consisting of anhydrides and acid halides of benzoic, toluic, cinnamic, phthalic and naphthoic acids.

3. Process for the manufacture of vat dyestuffs of the anthraquinone series, consisting in causing to act on ketones of the general formula—

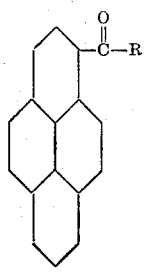

in which R stands for an aromatic nucleus selected from the group consisting of nuclei of the benzene or naphthalene series, in presence of a condensing agent of the group consisting of aluminium chloride and ferric chloride and in presence of an indifferent flux, at temperatures lying above 110° C., reactive derivatives selected from the group consisting of anhydrides and acid halides of benzoic, toluic, cinnamic, phthalic and naphthoic acids, in which the aromatic nucleus is different from the aromatic nucleus R.

4. Process for the manufacture of vat dyestuffs of the anthraquinone series, consisting in causing to act on ketones of the general formula—

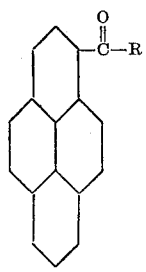

in which R stands for an aromatic nucleus of the benzene series in presence of a condensing agent of the group consisting of aluminium chloride and ferric chloride and in presence of an indifferent flux, at temperatures lying above 110° C., reactive derivatives selected from the group consisting of anhydrides and acid halides of benzoic, toluic, cinnamic, phthalic and naphthoic acids, in which the aromatic nucleus is different from the aromatic nucleus R.

5. Process for the manufacture of vat dyestuffs of the anthraquinone series, consisting in causing to act on ketones of the general formula—

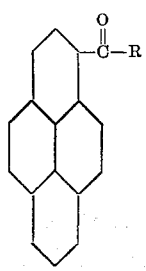

in which R stands for an aromatic nucleus of the benzene series in presence of a condensing agent of the group consisting of aluminium chloride and ferric chloride and in presence of an indifferent flux, at temperatures lying between 110° and 200° C., reactive derivatives selected from the group consisting of anhydrides and acid halides of benzoic, toluic, cinnamic, phthalic and naphthoic acids, in which the aromatic nucleus is different from the aromatic nucleus R.

6. Process for the manufacture of vat dyestuffs of the anthraquinone series, consisting in causing phthalic anhydride to act on a ketone of the general formula—

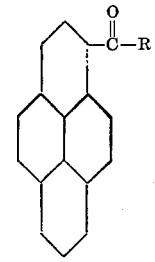

in which R stands for a nucleus of the benzene series, in presence of a condensing agent of the group consisting of aluminium chloride and ferric chloride and in presence of an indifferent flux, and at temperatures lying between 110° and 200° C.

7. Process for the manufacture of vat dyestuffs of the anthraquinone series, consisting in causing cinnamic acid to act on a ketone of the general formula—

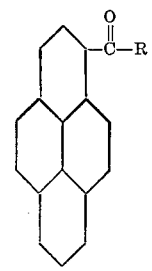

in which R stands for a nucleus of the benzene series, in presence of a condensing agent of the group consisting of aluminium chloride and ferric chloride and in presence of an indifferent flux, and at temperatures lying between 110° and 200° C.

8. Process for the manufacture of vat dyestuffs of the anthraquinone series, consisting in causing para-toluic acid chloride to act on the ketone of the formula—

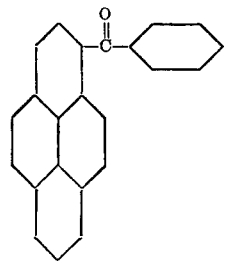

in presence of a condensing agent of the group consisting of aluminium chloride and ferric chloride and in presence of an indifferent flux, and at temperatures lying between 110° and 200° C.

9. The vat dyestuffs of the general formula—

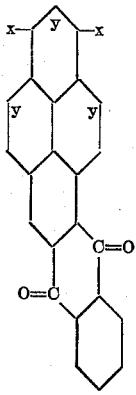

in which one $x$ stands for a hydrogen atom and the other $x$ stands for a C=O group which is linked by a chain consisting of two to three carbon atoms to a carbon atom $y$ of the pyrene ring in such a manner that there is formed a new six membered ring, which products are dark powders insoluble in water, but dissolving in sulfuric acid to violet-blue to green solutions, yielding with hydrosulfite and sodium hydroxide solution violet to black-violet vats from which cotton is dyed fast yellow-orange to brown-orange tints.

10. The vat dyestuffs of the general formula—

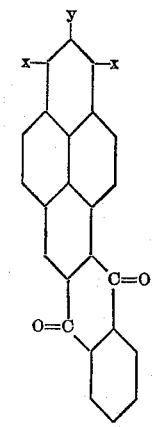

in which one $x$ stands for a hydrogen atom and the other $x$ stands for a C=O group, and in which $y$ stands for a further C=O group, the two C=O groups being linked themselves in ortho-position to each other to one and the same benzene ring, which products are dark powders, insoluble in water, but dissolving in sulfuric acid to green solutions, yielding with hydrosulfite and sodium hydroxide solution black-violet vats from which cotton is dyed yellow-orange tints.

ROLAND SCHOLL.
KURT MEYER.
JOACHIM DONAT.